Figure 1:
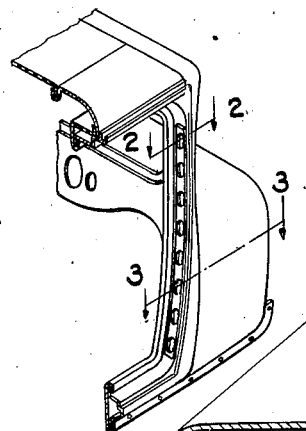

Aug. 25, 1931.  J. P. TARBOX  1,820,036
FRONT POST CONSTRUCTION FOR VEHICLE BODIES
Filed Dec. 21, 1927

INVENTOR.
John P. Tarbox

Patented Aug. 25, 1931

1,820,036

UNITED STATES PATENT OFFICE

JOHN P. TARBOX, OF PHILADELPHIA, PENNSYLVANIA, ASSIGNOR TO EDWARD G. BUDD MANUFACTURING CO., OF PHILADELPHIA, PENNSYLVANIA, A CORPORATION OF PENNSYLVANIA

FRONT POST CONSTRUCTION FOR VEHICLE BODIES

Application filed December 21, 1927. Serial No. 241,687.

My invention relates to automobile bodies and more particularly to such bodies built up of sheet metal stampings in unit sub-assemblies.

It is the main object of my invention to provide a structure at the A-post through which the vision of the occupants of the front or driver's seat is not interfered with yet one through which the strength of such A-post structure is ample to resist the wracking strains to which it is subject in use.

To this end I have produced a structure of combined A-post, door frame and windshield frame which, in a direction substantially transverse of the line of vision of an occupant of the front or driver's seat, is of an overall dimension not greater than the inter-pupillary distance between the eyes of such occupant, and which in the direction of the line of vision is not extended so as to detract from the appearance of the car.

Moreover, I attain such desirable structure with very simple modification of the methods of manufacture and slight changes in structure of the units, which, in one form of body to which my invention is particularly adapted, go to make up the A-post structure; nor is it necessary to change the door and windshield structure heretofore used.

In the drawings, I have shown my invention embodied in a body having side and front unit assemblies built up of outer and inner panels joined in their margins and in which the doors are correspondingly built up.

In the drawings, Fig. 1 is a perspective view of the front portion of a body to which I have shown my invention applied.

Figure 2:
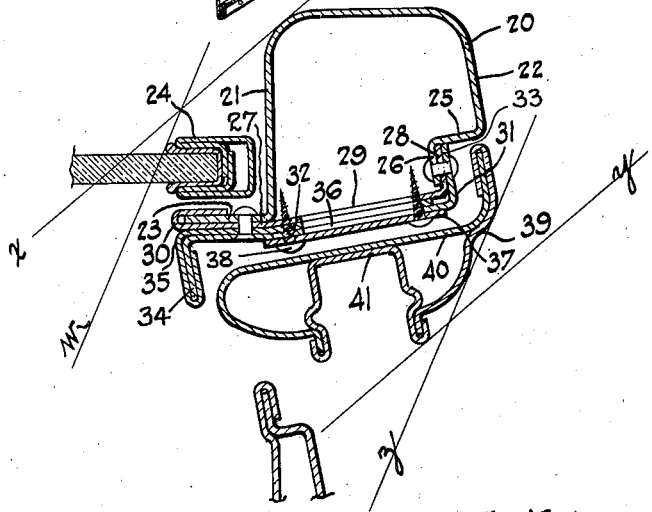
Figure 3:
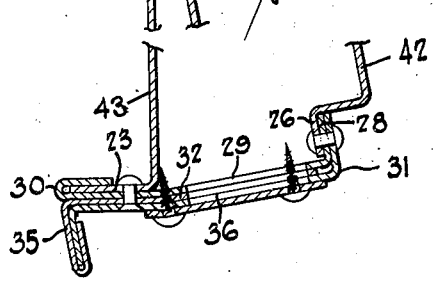

Figs. 2 and 3 are detail sectional views taken respectively on the lines 2—2 and 3—3 of Fig. 1 and showing in the case of Fig. 2, the adjacent door and windshield frame in their relation to the A-post structure. These sectional views are substantially full size views.

Figure 4:
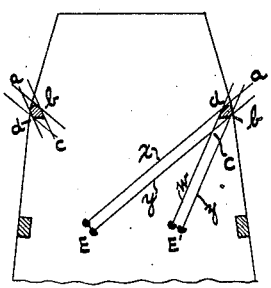

Fig. 4 is a diagrammatic representation in plan showing the manner in which my improved post structure is laid out so as to avoid interference with the vision of any one in any normal position on the front or driver's seat of a car equipped with my invention.

In the diagram of Fig. 4, $a$—$a$ represents the A-post structures, including the adjacent door and windshield frames, and it will be seen that they lie entirely within the rhombus $a$-$b$-$c$-$d$ formed by the intersecting pairs of parallel lines drawn $x$, $y$ and $w$, $z$, respectively, from the eyes E of a person occupying the driver's position and from the eye E' of a person occupying the seat opposite the driver's position. Since the parallel lines are spaced approximately the interpupillary distance, it follows that if the A-post structures including the door and windshield frames is of such an aggregate dimension as to be contained entirely within the rhombus $a$, $b$, $c$, $d$, that full vision will be had in all directions forwardly of the driver's seat from any normally occupied position of said seat for the full width of the car.

In the body to which I have shown my invention applied, the A-post is made up of a front unit portion comprising above the belt line, the deep rearwardly presenting channel form outer panel stamping 20 having the inner side wall 21 of greater depth than the outer side wall 22. The inner side wall has at its rear edge, the inwardly extending flange 23 which forms with the side wall 21 a rabbet, which receives within it the edge of the windshield so that the windshield frame 24, lies almost wholly within the rabbet, and offers substantially no obstruction to vision.

The outer side wall 22 of the channel is provided with an inwardly extending flange 25 terminating in a rearwardly extending flange 26 which together form a rabbet to receive the edge of a door.

This flanged channel is in itself a very strong and stiff structure, but it is reinforced and strengthened by the stamping 27 secured across its mouth. This stamping may form, in the present embodiment of my invention, a portion of the inner reinforcing stamping extending throughout the windshield frame and A-post portion of the front unit. It is flanged forwardly at its outer margin, at 28, this flange lying against the edge flange 26 of the channel, and being secured thereto, in the first instance, by spot welding. Access for spot welding may be had by providing the stamping with suitable openings 29. The inner edge 30 of the stamping may be secured by crimping it over the flange 23 of the channel 20.

Thus a rigid box section structure is produced of ample cross sectional dimensions to permit the use of relatively light gauge stock and yet secure ample strength. This constitutes the A-post portion of the front unit, which might in some cases be itself of sufficient strength to complete the A-post structure. However, in this type of body, it is desirable to extend the large side wall stampings entirely around the door opening, and it has heretofore been proposed to provide the side wall with an A-post portion of substantially Z-form in cross section.

This A-post portion of the side unit comprises a Z-section outer panel portion 31 having a main transverse web 32, a forwardly projecting outer arm 33 and a rearwardly projecting inner arm 34. The inner panel 35 is of angle section and has one edge crimped over the outer and its main transverse body portion lying against the web of the Z of the outer panel portion.

In the final assembly, the outer arm 31 of the Z, and the main body of the Z are adapted to nest with the flange 28 and transverse body of the stamping 27, and these parts are secured together as by rivets. Such riveting may, at the outer edge, be through the three thicknesses of metal 26, 28 and 31 and the body webs of the outer and inner side panel portion 32, 35. Suitable openings 36 are provided in the portions 32, 35 to permit access of riveting tools to the inner side of flange 26. When the joinder is completed, the holes may be covered by a plate 37, secured in place by drive screws 38.

By this construction, it will be seen that the nested Z-section side unit portion adds almost nothing to the thickness of the post portion of the front unit but serves as a strong reinforcement therefor, and the ensemble produces a post structure, which may be of light gauge metal, yet because of the flanged channel, and the multi-ply angle a Z-section reinforcing means closing the mouth of the channel is of great strength and rigidity.

The door frame closes against the rabbeted and reinforced rear face of the post structure as shown in Fig. 2, and may be of a usual construction comprised opposite the window opening of an outer panel portion 39 an inner panel portion 40 forming the jamb face and overlap flange and, a glass run channel 41 welded to the transverse web of the outer panel.

The outer panel is secured to the door overlap flange of the inner panel and to a side wall of the glass run by crimping and the inner edge portion of the inner panel is turned over and secured by crimping to the other side wall of the glass run. The outer panel slopes inwardly toward the plane of the door, so that the door frame adds but little to the aggregate opaque projection of the post, door frame and windshield, although, because of its double box section structure, it provides a very rigid structure.

It is, of course, understood that, other forms of door structures could be used with the post structure described, and yet retaining the full vision features of the ensemble.

Below the belt line, see Fig. 3, the forwardly facing channel merges into the outer cowl panel 42, and a separate inner cowl panel stamping 43 is provided, the forward edge of which is secured by crimping, to the forward edge of the outer cowl panel and the flanged rear edge to the stamping 27, in a manner similar to the joinder of the inner side wall 21 of the channel to the stamping 27 above the belt-line. As clearly appears in Fig. 3, the joinder of the side unit to the front unit below the belt is entirely similar to the joinder above the belt and need not therefore be further described.

While I have herein shown and described a specific form of my invention, it will be evident that this may be modified in various respects, and I desire it to be understood that my invention include all such modifications as fall within the spirit and scope of the appended claims.

What I claim is:—

1. In a vehicle body construction, a cowl unit including a hollow A-post structure built up of outer and inner panels, said outer panel being a rearwardly presenting channel having its side walls flanged inwardly of the body and the inner panel bridging the walls of said channel and secured to said flanges, and a side unit having an A-post portion of web cross section fitting against and secured to the rearwardly facing wall of the A-post portion of the cowl.

2. In a vehicle body construction, a sheet metal A-post structure comprising a hollow cowl unit section having a rear wall provided with a rabbet on one side to receive the edge of the door and a rabbet on the opposite side to receive the edge of the windshield, and an angular section side frame unit portion nested with the rear wall of the cowl unit portion and secured thereto in final assembly.

3. In a vehicle body construction, a sheet metal A-post structure comprising a cowl unit portion built up of metal stampings to form a closed box-section having formed therein rabbets to receive the adjacent door and windshield edges and a side frame unit portion of angular section having one arm thereof secured in the door overlap rabbet and its main web portion lying against and secured to the rear transverse face of the cowl unit portion in final assembly.

4. In a vehicle body construction, a sheet metal A-post structure comprising a box section cowl unit portion having a rabbet formed in its rear outer edge to receive the edge of the door and a transversely extending jamb face portion and a substantially Z-section side unit portion having one arm and its main body web nested with the inner wall of said rabbet and said transversely extending jamb face portion and secured thereto in final assembly.

5. In a vehicle body construction the hollow A-post structure comprising a stamping of channel cross section presenting rearwardly having both side walls flanged transversely inwardly of the body and an open channel mouth irrespective of said flanges, the outer of said flanges being of angular cross section, a stamping secured to the respective flanges and closing the mouth of the channel, a door having an outer overlap received in the angle section of the outer flange of the channel and a windshield having a frame received substantially entirely in the triangular space between the inner side wall and its flange.

In testimony whereof I hereunto affix my signature.

JOHN P. TARBOX.